(12) United States Patent
Shang et al.

(10) Patent No.: US 9,503,882 B2
(45) Date of Patent: Nov. 22, 2016

(54) SERVICE PROCESSING METHOD AND TERMINAL

(71) Applicant: ZTE CORPORATION, Shenzhen (CN)

(72) Inventors: Guoqiang Shang, Shenzhen (CN); Lizhe Yao, Shenzhen (CN); Jun Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/435,284

(22) PCT Filed: Aug. 19, 2013

(86) PCT No.: PCT/CN2013/081789
§ 371 (c)(1),
(2) Date: Apr. 13, 2015

(87) PCT Pub. No.: WO2013/189368
PCT Pub. Date: Dec. 27, 2013

(65) Prior Publication Data
US 2015/0271661 A1    Sep. 24, 2015

(30) Foreign Application Priority Data
Oct. 15, 2012    (CN) .......................... 2012 1 0389836

(51) Int. Cl.
*H04W 8/18* (2009.01)
*H04L 29/08* (2006.01)
(Continued)

(52) U.S. Cl.
CPC ............... *H04W 8/18* (2013.01); *G06F 9/46* (2013.01); *H04L 67/145* (2013.01); *H04W 4/001* (2013.01); *H04W 4/06* (2013.01); *H04W 8/30* (2013.01); *H04W 36/0033* (2013.01)

(58) Field of Classification Search
CPC ........ H04W 4/001; H04W 8/18; H04W 8/30

USPC .......... 455/414.1, 450, 454, 456.3; 370/329; 709/226
See application file for complete search history.

(56) References Cited

U.S. PATENT DOCUMENTS 8,203,594 B2 *  6/2012  Jaspersohn ......... H04M 7/0072
                                                348/14.01
8,375,130 B2 *  2/2013  Eberlein ............. H04L 41/0813
                                                709/223

(Continued)

FOREIGN PATENT DOCUMENTS

CN       101707686       5/2010
CN       102695129       9/2012
(Continued)

OTHER PUBLICATIONS

NEC et al., "Suspension and Resume function" 3GPP DRAFT; R3-110949-WAS-711-MBMSSUSPEND-CR36300, 3rd Generation Partnership Project (3GPP), vol. RA WG3, No. Taipei, Taiwan: Feb. 21, 2011, Feb. 25, 2011 XP050497848 (retrieved on Feb. 25, 2011).

*Primary Examiner* — Cong Tran
(74) *Attorney, Agent, or Firm* — Pearl Cohen Zedek Latzer Baratz LLP

(57) ABSTRACT

A service processing method comprises: after receiving a service sharing request from another terminal, a terminal storing context information of a current state of the terminal, and then switching to the shared service; and when a fallback condition in a preset policy is satisfied, recovering to the state before the switch according to the context information. An embodiment of the present invention also provides a terminal Embodiments of the present invention allow fallback to the state before the service sharing, and thus avoid complex setting and operation of a user.

18 Claims, 1 Drawing Sheet

(51) Int. Cl.
  *H04W 4/06*      (2009.01)
  *H04W 4/00*      (2009.01)
  *G06F 9/46*      (2006.01)
  *H04W 36/00*     (2009.01)
  *H04W 8/30*      (2009.01)

(56) References Cited

U.S. PATENT DOCUMENTS

| | | | | |
|---|---|---|---|---|
| 8,959,598 B2* | 2/2015 | Smith | ............... | H04L 63/06 |
| | | | | 713/176 |
| 2006/0184535 A1 | 8/2006 | Kaluskar et al. | | |
| 2006/0291481 A1 | 12/2006 | Kumar | | |
| 2010/0080361 A1* | 4/2010 | Houghton | ............ | H04M 3/307 |
| | | | | 379/87 |
| 2012/0309425 A1* | 12/2012 | El Khayat | ............... | H04L 67/18 |
| | | | | 455/456.3 |
| 2013/0232552 A1* | 9/2013 | Brush | ................. | G06F 21/6263 |
| | | | | 726/4 |
| 2013/0273933 A1* | 10/2013 | Sadeghi | ................ | H04W 16/14 |
| | | | | 455/454 |

FOREIGN PATENT DOCUMENTS

| | | |
|---|---|---|
| EP | 2393260 | 12/2011 |
| EP | 2450793 | 5/2012 |
| WO | WO 2012131708 | 10/2012 |

\* cited by examiner

SERVICE PROCESSING METHOD AND TERMINAL

CROSS-REFERENCE TO RELATED APPLICATIONS

This application is a National Phase Application of PCT International Application No. PCT/CN2013/081789, entitled "SERVICE PROCESSING METHOD AND TERMINAL", International Filing Date Aug. 19, 2013, published on Dec. 27, 2013 as International Publication No. WO 2013/189368, which in turn claims priority from Chinese Patent Application No. 201210389836.6, filed Oct. 15, 2012, all of which are incorporated herein by reference in their entirety.

FIELD OF THE INVENTION

The present document relates to a communication system, and in particular, to a service processing method and terminal.

BACKGROUND

Under the situation that the multimedia technology, wireless communication, wireless local area networks etc. develop rapidly, terminals of users or terminals of different friend users frequently share some service data. Under the permission of a user preference policy, users may conveniently share contents of services, which largely enrich contact of users and sharing of contents. However, a resulting impact is that a user may easily be interrupted by a service shared by his/her friend, and then the user may have to manually recover his/her previous data, or constantly modify the corresponding sharing policy. Such operations will bring great inconvenience to the user while bringing abundant contents.

SUMMARY

A technical problem to be solved by embodiments of the present invention is to provide a service processing method and terminal, to overcome the inconvenience brought to a user due to interruption of a service by a shared service.

In order to solve the above problem, an embodiment of the present invention provides a service processing method, comprising:

after receiving a service sharing request from another terminal, a terminal storing context information of a current state of the terminal, and then switching to the shared service; and when a fallback condition in a preset policy is satisfied, recovering to the state before the switch according to the context information.

Optionally, the above method may further have the following features: the fallback condition comprises one of the following conditions or a combination of the following conditions which do not conflict:

receiving a shared service end message transmitted by the another terminal;

receiving a shared service stop message transmitted by the another terminal;

receiving a shared service pause message transmitted by the another terminal;

receiving a shared service pause message transmitted by the another terminal, and the shared service not continuing after waiting for a specified time; and the terminal ending the shared service locally.

Optionally, the above method may further have the following features: the method further comprises:

before switching to the shared service, the terminal shutting down a service which is currently running according to the preset policy, or running the service which is currently running in the background.

Optionally, the above method may further have the following features: the context information is stored locally or on a network.

Optionally, the above method may further have the following features: the preset policy is preset by a system or is set by a user.

An embodiment of the present invention further provides a terminal comprising a policy module, a sharing processing module, and a context processing module, wherein, the policy module is configured to store a preset policy, the preset policy containing a fallback condition;

the sharing processing module is configured to, after receiving a service sharing request from another terminal, notify the context processing module to perform backup, or notify a related service module in order that the related service module notifies the context processing module to perform backup; after the context processing module stores context information of a current state of the terminal, switch to the shared service; and when the fallback condition is satisfied, instruct the context processing module to acquire the context information and recover to the state before the switch according to the context information; and the context processing module is configured to, after receiving a backup notification from the sharing processing module or the service module, acquire the context information of the current state of the terminal, store the context information in a context storage list, and after receiving the instruction from the sharing processing module, acquire the context information from the context storage list.

Optionally, the above terminal may further have the following features: the fallback condition comprises one of the following conditions or a combination of the following conditions which do not conflict:

receiving a shared service end message transmitted by the another terminal;

receiving a shared service stop message transmitted by the another terminal;

receiving a shared service pause message transmitted by the another terminal;

receiving a shared service pause message transmitted by the another terminal, and the shared service not continuing after waiting for a specified time; and the terminal ending the shared service locally.

Optionally, the above terminal may further have the following features: the sharing processing module is further configured to, before switching to the shared service, shut down a service which is currently running according to the preset policy, or run the service which is currently running in the background.

Optionally, the above terminal may further have the following features: the context processing module stores the context information locally or in the context storage list on a network.

Optionally, the above terminal may further have the following features: the preset policy stored by the policy module is preset by a system or is set by a user.

Embodiments of the present invention propose a service processing method and terminal, in which a policy can be set, so that the terminal implements fallback according to the policy to rapidly falls back to the application which is switched due to service sharing, and ensures that the service application continues to run, which avoids frequent manual data recovery or policy modification of the user.

DETAILED DESCRIPTION

Embodiments of the present invention will be described in detail below in conjunction with accompanying drawings. It should be explained that without a conflict, embodiments in the present application and the features in the embodiments may be combined with each other randomly.

Figure 1:
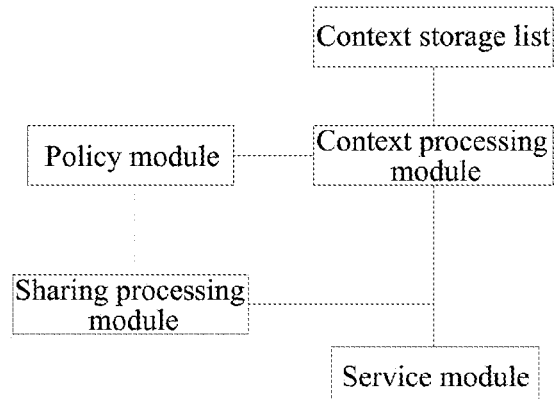
FIG. 1 is a block diagram of a terminal according to an embodiment of the present invention.

An embodiment of the present invention provide a terminal, as shown in FIG. 1, comprising: a policy module, a sharing processing module, and a context processing module, and the terminal may further comprise a service module, wherein, the policy module is configured to store a preset policy, the preset policy containing a fallback condition;

the sharing processing module is configured to, after receiving a service sharing request from another terminal, notify the context processing module to perform backup, or notify a related service module in order that the related service module notifies the context processing module to perform backup; after the context processing module stores context information of a current state of the terminal, switch to the shared service; and when the fallback condition is satisfied, instruct the context processing module to acquire the context information and recover to the state before the switch according to the context information; and the context processing module is configured to, after receiving a backup notification from the sharing processing module or the service module, acquire the context information of the current state of the terminal, store the context information in a context storage list, and after receiving the instruction from the sharing processing module, acquire the context information from the context storage list. Specifically, when there is a service running currently, the context processing module and the service module interact to acquire the context information.

Wherein, the fallback condition comprises one of the following conditions or a combination of the following conditions which do not conflict:

receiving a shared service end message transmitted by the another terminal;

receiving a shared service stop message transmitted by the another terminal;

receiving a shared service pause message transmitted by the another terminal;

receiving a shared service pause message transmitted by the another terminal, and the shared service not continuing after waiting for a specified time; the difference between this condition and the previous condition is that after receiving the shared service pause message, fallback may be performed immediately or may be performed after waiting for a specified time, which is decided according to a current particular policy;

the terminal ending the shared service locally.

The above fallback conditions are merely examples, and may be set according to requirements.

Wherein, the sharing processing module is further configured to, before switching to the shared service, shut down the service which is currently running according to the preset policy, or run the service which is currently running in the background. That is, the preset policy further includes the following policy: shutting down the current service application when switch is performed, or running the current service application in the background when switch is performed.

Wherein, the context processing module stores the context information locally or in a context storage list on a network.

Wherein, the preset policy stored by the policy module is preset by a system (including being set by a service) or is set by a user.

Wherein, when the user retrieves the context information in the context list and requests for recovery, the sharing processing module recovers to a corresponding state according to the context information.

The preset policy may comprise one or a combination of: automatically recovering an application (recovering to an application before the switch); manually retrieving the context list to recover to a corresponding application; shutting down a service application when the switch is performed; or merely running the service application in the background when the switch is performed; a fallback condition.

The sharing processing module may interact with the service module, and the sharing processing module may also deliver a corresponding message to the policy module.

The context information is information necessary to ensure an service application, such as time information, link information, device information etc. of a video or audio service, or may also be progress information of text reading etc., and the context information has a close relationship with the service application; and general context information may further comprise whether it is a focus application etc.;

The context storage list is used to store the context information of a service application acquired by the context processing module, and the context information may be stored locally or stored on a network.

The service module refers to a service application running on the terminal, such as a short message application, a media player application, a network connection application etc.

An embodiment of the present invention further provides a service processing method, comprising:

after receiving a service sharing request from another terminal, a terminal storing context information of a current state of the terminal, and then switching to the shared service; and when a fallback condition in a preset policy is satisfied, the terminal recovering to the state before the switch according to the context information, for example, switching to the service which runs before running of the shared service.

Wherein, the fallback condition comprises one of the following conditions or a combination of the following conditions which do not conflict:

receiving a shared service end message transmitted by the another terminal;

receiving a shared service stop message transmitted by the another terminal;

receiving a shared service pause message transmitted by the another terminal;

receiving a shared service pause message transmitted by the another terminal, and the shared service not continuing after waiting for a specified time; and the terminal ending the shared service locally.

Wherein, the method further comprises:

before switching to the shared service, the terminal shutting down the service which is currently running according to the preset policy, or running the service which is currently running in the background.

Wherein, the preset policy is preset by a system or is set by a user.

Figure 2:
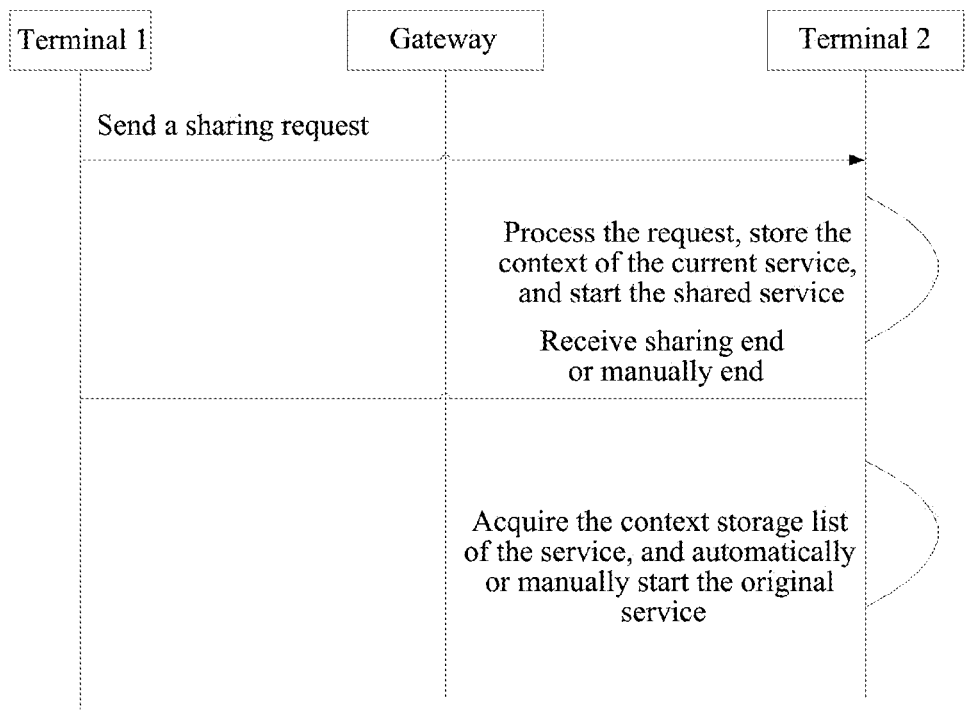
FIG. 2 is a service processing flowchart according to an embodiment of the present invention.

As shown in FIG. 2, terminals may directly communicate with each other, or may communicate with each other through a gateway. As the gateway is a network element which is mainly used for accomplishing communication between terminals in embodiments of the present invention, the gateway will not be primarily described herein.

The policy for a related service application during service sharing is set on the terminal 2; and a service processing method provided by an embodiment of the present invention comprises:

Step 10, a terminal 1 transmits a service sharing request to a terminal 2;

Step 20, the terminal 2 receives the service sharing request, performs corresponding processing, stores context information of a current service application, stores the context information in a context storage list, and switches to the shared service; and Step 30, the terminal 1 transmits a shared service termination or pause message to the terminal 2, and after receiving the message, the terminal 2 performs service fallback processing, and recovers a corresponding service application according to the context information in the context storage list.

Taking a local service in the apparatus 2 being a game and a shared service of the apparatus 1 being movie playing as an example, embodiment one comprises:

Step 101, a policy is set by a policy module.

The set policy is assumed as:

automatically accepting the service after receiving a service sharing request;

shutting down an original service;

automatically falling back to the original service after receiving a shared service end message;

falling back to the original service after receiving a shared service pause message and if the shared service does not continue after waiting for 15 seconds;

The above policies are merely examples, and other policies may be set according to requirements. Step 102, the apparatus 1 and the apparatus 2 run online, and the apparatus 1 and the apparatus 2 can find each other and can communicate with each other through a communication system and/or a sharing processing module;

Step 103, the apparatus 1 transmits a service sharing request to the apparatus 2, for example, the shared service is playing a movie by a media;

Step 104, the sharing processing module of the apparatus 2 receives and accepts the service sharing request, notifies the policy module and the service application which is currently being used, i.e., the game service, or notifies the context processing module. The context processing module interacts with the game service application, and stores related context information of the game, such as game progress etc. The context processing module stores the context information in a context storage list. The sharing processing module shuts down the game service application according to the information of the policy module, and starts the media playing service application, receives media data from the apparatus 1 and presents the media data on the apparatus 2;

Step 105, the apparatus 1 transmits a pause message to the apparatus 2, after receiving the pause message, the apparatus 2 detects a pause time, and when the time exceeds a set condition in the policy module, e.g., the pause exceeds 15 seconds in this example, the apparatus starts a fallback operation, and falls back to the game service application according to the information in the context storage list;

Step 106, the apparatus 1 transmits a playing recovery message to the apparatus 2, and after receiving the message, the apparatus 2 performs operations of steps 103 and 104 again; and Step 107, the apparatus 1 transmits a sharing stop or sharing end message to the apparatus 2, and the apparatus 2 falls back to the game service application according to the information in the context storage list, i.e., starting the game application, and locating to the game progress or other important states before exit of the game application.

Taking a current service of the apparatus 2 being a movie and a shared service of the apparatus 1 being a television program as an example, Embodiment two comprises: Step 201, a policy is set by a policy module.

The set policy is assumed as:

automatically accepting the service after receiving a service sharing request;

shutting down an original service;

automatically falling back to the original service after receiving a shared service end message;

falling back to the original service after receiving a shared service pause message and if the shared service does not continue after waiting for 15 seconds;

Step 202, the apparatus 1 and the apparatus 2 run online, and the apparatus 1 and the apparatus 2 can find each other and can communicate with each other through a communication system and/or a sharing processing module,;

The service application used by the apparatus 2 is movie watching, and the application on the apparatus 2 currently shares capability with many other apparatuses and devices, for example, plays sound through another speaker, i.e., the service application of the apparatus 2 is implemented through capability sharing of many other apparatuses and devices, and the context information involved in the use of the service application in the apparatus 2 includes sharing information of many other apparatuses and devices.

Step 203, the apparatus 1 transmits a service sharing request to the apparatus 2, for example, the shared service is a television program;

Step 204, the sharing processing module of the apparatus 2 receives and accepts the request message, notifies the policy module and the service application which is currently being used, i.e., the movie playing service. The movie playing service application interacts with the context processing module, stores related context information of this service, such as playing progress, movie address, shared service capability information, such as position information, playing channel information of the playing speaker etc. The context processing module stores the context information in the context storage module. The sharing processing module shuts down the movie playing service application according to the information of the policy module, starts the television program playing service application, receives media data from the apparatus 1 and presents the media data on the apparatus 2;

Step 205, the apparatus 1 transmits a sharing stop or sharing end message to the apparatus 2, the apparatus 2 falls back to the movie playing service application according to the information in the context storage list, i.e., starting the movie playing service application, and locating to the playing progress before the exit, recovering capability sharing with other devices, such as capability sharing with a speaker, i.e., playing the sound of the movie through the speaker device;

In embodiments of the present invention, it is ensured that after a user receives a service sharing request, the context information of some services which are currently running can be stored in a context list, the service application is exited or the service application runs in the background according to a policy, and after receiving sharing end information, under the permission of the policy module, by acquiring the context information and starting a corresponding service application according to the context information, the service application is recovered to the state or content of the stored context information, so that the service application continues to run. With such a process of record storage and fallback recovery, the user's operation on the apparatus complies better with a general use process experience.

INDUSTRIAL APPLICABILITY

Embodiments of the present invention propose a service processing method and terminal, in which a policy can be set, so that the terminal implements fallback according to the policy to rapidly falls back to the application which is switched due to service sharing, and ensures that the service application continues to run, which avoids frequent manual data recovery or policy modification of the user.

What is claimed is:

1. A service processing method, comprising:
when receiving a service sharing request by a terminal from another terminal, the terminal storing context information of a current state of a service application of the terminal, and then switching from the service application to another service application for a shared service shared by the another terminal with the terminal; and
when a fallback condition in a preset policy is satisfied, recovering to the current state of the service application before the switch according to the context information.

2. The method according to claim 1, wherein, the fallback condition comprises one of the following conditions or a combination of the following conditions which do not conflict:
receiving a shared service end message;
receiving a shared service stop message;
receiving a shared service pause message;
receiving a shared service pause message, and the shared service not continuing after waiting for a specified time; and
the terminal ending the shared service locally.

3. The method according to claim 1, further comprising:
before switching to the another service application, the terminal shutting down the service application which is currently running according to the preset policy, or running the service application which is currently running in a background.

4. The method according to claim 1, wherein, the context information is stored locally or on a network.

5. The method according to claim 1, wherein, the preset policy is preset by a system or is set by a user.

6. A terminal comprising a policy module, a sharing processing module, and a context processing module, wherein,
the policy module is configured to store a preset policy, the preset policy containing a fallback condition;

the sharing processing module is configured to, when receiving a service sharing request from another terminal, notify the context processing module to perform backup, or notify a related service module in order that the related service module notifies the context processing module to perform backup; after the context processing module stores context information of a current state of a service application of the terminal, switch from the service application to another service application for a shared service shared by the another terminal with the terminal; and when the fallback condition is satisfied, instruct the context processing module to acquire the context information and recover to the current state of the service application before the switch according to the context information; and the context processing module is configured to, after receiving a backup notification from the sharing processing module or the service module, acquire the context information of the current state of the service application, store the context information in a context storage list, and after receiving the instruction from the sharing processing module, acquire the context information from the context storage list.

7. The terminal according to claim 6, wherein, the fallback condition comprises one of the following conditions or a combination of the following conditions which do not conflict:
receiving a shared service end message;
receiving a shared service stop message;
receiving a shared service pause message;
receiving a shared service pause message, and the shared service not continuing after waiting for a specified time; and
the terminal ending the shared service locally.

8. The terminal according to claim 6, wherein,
the sharing processing module is further configured to, before switching to the another service application, shut down the service application which is currently running according to the preset policy, or run the service application which is currently running in a background.

9. The terminal according to claim 6, wherein, the context processing module stores the context information locally or in the context storage list on a network.

10. The terminal according to claim 6, wherein, the preset policy stored by the policy module is preset by a system or is set by a user.

11. The method according to claim 2, wherein, the context information is stored locally or on a network.

12. The method according to claim 3, wherein, the context information is stored locally or on a network.

13. The method according to claim 2, wherein, the preset policy is preset by a system or is set by a user.

14. The method according to claim 3, wherein, the preset policy is preset by a system or is set by a user.

15. The terminal according to claim 7, wherein, the context processing module stores the context information locally or in the context storage list on a network.

16. The terminal according to claim 8, wherein, the context processing module stores the context information locally or in the context storage list on a network.

17. The terminal according to claim 7, wherein, the preset policy stored by the policy module is preset by a system or is set by a user.

18. The terminal according to claim 8, wherein, the preset policy stored by the policy module is preset by a system or is set by a user.

\* \* \* \* \*